(12) United States Patent
Aoki et al.

(10) Patent No.: US 8,509,238 B2
(45) Date of Patent: Aug. 13, 2013

(54) COMMUNICATION NETWORK, INFORMATION PROCESSOR AND ADDRESS ASSIGNING METHOD

(75) Inventors: Yuuichi Aoki, Tokyo (JP); Tohru Kimura, Tokyo (JP); Hitoshi Yano, Tokyo (JP); Nobuhide Yoshida, Tokyo (JP); Daigo Taguchi, Tokyo (JP); Akitake Mitsuhashi, Tokyo (JP); Jun Noda, Tokyo (JP); Teruki Sukenari, Tokyo (JP); Kunihiro Suzuki, Tokyo (JP); Koji Fukami, Tokyo (JP)

(73) Assignees: NEC Corporation, Tokyo (JP); NEC Engineering, Ltd., Tokyo (JP)

( * ) Notice: Subject to any disclaimer, the term of this patent is extended or adjusted under 35 U.S.C. 154(b) by 753 days.

(21) Appl. No.: 12/515,899

(22) PCT Filed: Nov. 16, 2007

(86) PCT No.: PCT/JP2007/072267
§ 371 (c)(1),
(2), (4) Date: Nov. 24, 2009

(87) PCT Pub. No.: WO2008/062724
PCT Pub. Date: May 29, 2008

(65) Prior Publication Data
US 2010/0085969 A1     Apr. 8, 2010

(30) Foreign Application Priority Data

Nov. 22, 2006   (JP) ................................. 2006-315610

(51) Int. Cl.
*H04L 12/28*     (2006.01)
*H04L 12/56*     (2011.01)

(52) U.S. Cl.
USPC .......................................................... 370/392

(58) Field of Classification Search
USPC .......................................................... 370/392
See application file for complete search history.

(56) References Cited

U.S. PATENT DOCUMENTS

| | | | | |
|---|---|---|---|---|
| 5,142,531 | A * | 8/1992 | Kirby ............................ | 370/254 |
| 6,704,283 | B1 * | 3/2004 | Stiller et al. .................. | 370/238 |
| 7,830,838 | B2 * | 11/2010 | Kohvakka et al. ............ | 370/330 |
| 2003/0012168 | A1 * | 1/2003 | Elson et al. ................... | 370/338 |
| 2005/0117537 | A1 | 6/2005 | Okabe | |
| 2008/0056261 | A1 * | 3/2008 | Osborn et al. ................ | 370/392 |

FOREIGN PATENT DOCUMENTS

| | | |
|---|---|---|
| JP | 2003163673 A | 6/2003 |
| JP | 2004214956 A | 7/2004 |
| JP | 2005150866 A | 6/2005 |
| JP | 2005151059 A | 6/2005 |
| JP | 2005347980 A | 12/2005 |
| JP | 2006005928 A | 1/2006 |

OTHER PUBLICATIONS

Japanese Office Action for JP2008-545381 mailed on Jun. 19, 2012.

* cited by examiner

*Primary Examiner* — Ayaz Sheikh
*Assistant Examiner* — Blanche Wong

(57) ABSTRACT

A communication network of the present invention includes: a plurality of superordinate nodes 110 to 1$m$0 forming a cascade type topology; and a plurality of terminal nodes 111 to 11$n$, connected to at least one superordinate node from among said plurality of superordinate nodes and forming a star type topology with the superordinate node connected.

7 Claims, 8 Drawing Sheets

COMMUNICATION NETWORK, INFORMATION PROCESSOR AND ADDRESS ASSIGNING METHOD

This application is the National Phase of PCT/JP2007/072267, filed Nov. 16, 2007, which is based upon and claims the benefit of priority from Japanese Patent Application No. 2006-315610 filed on Nov. 22, 2006, the content of which is incorporated by reference.

1. Technical Field

The present invention relates to a communication network to which a plurality of information processors such as computers, hubs, routers and the like are connected, an information processor for assigning addresses to other devices connected thereto and an address assigning method.

2. Background Art

Topologies showing connected forms of related communication networks will be described. FIGS. 1 to 6 are diagrams showing configurational examples of communication networks.

FIG. 1 is a diagram for illustrating a bus type topology. In the bus type topology, one communication path 20 are shared by all nodes 1. When a node is communicating with another node, it cannot communicate with any other node. Also, when the communication path is formed wirelessly, all the nodes need to exist within the wireless coverage. A node corresponds to an information processor.

FIG. 2 is a diagram for illustrating a ring type topology. A ring type topology is a bus type topology whose ends are connected to each other. A plurality of nodes 10 are connected by ring-like communication path 21. With this arrangement, even if the communication path is broken at one spot, information can be transferred from the opposite side.

FIG. 3 is a diagram for illustrating a peer-to-peer type topology. In the peer-to-peer topology, one communication path 2 is shared only between two nodes 1.

FIG. 4 is a diagram for illustrating a cascade type topology. Also in the cascade type topology, one communication path 2 is shared only between two nodes. The feature of the cascade type topology resides in that communication to a remote node is made such that information is transferred from one node to another in a bucket brigade manner. When information is sent from node 11a to node 11b, information is conveyed from node 11a to node 11b by way of nodes 10a and 10b. Accordingly, even if, for example the wireless communication range of node 11a is limited up to node 10a, it is essentially possible to establish communication to node 11b, which is located beyond the wireless coverage, by way of other nodes 10a and 10b.

FIG. 5 is a diagram for illustrating a mesh type topology. Also in the mesh type topology, one communication path 2 is shared only between two nodes 10. Further, when communication is made to a remote node, information is transferred from one node to another in a bucket brigade manner. The feature of the mesh type topology resides in that two nodes, from among all the nodes or from among a part of the nodes not only have the path joined directly between the two nodes, but also have a plurality of paths joined by way of other nodes. When this holds for all the nodes, it is called a full mesh, and when this holds for part of the nodes, it is called a partial mesh.

FIG. 6 is a diagram for illustrating a star type topology. In the star type topology, all the other terminal nodes 11 are connected concentratedly to single centered node 10. In general, terminal nodes 11 do not share communication path 2. However, even when two or more terminal nodes share one communication path, if a scheme in which no communication between the terminal nodes occurs or a scheme in which communication between terminal nodes is all established by way of the centered node, is adopted, these cases correspond to star type topologies. When communication paths 2 are configured wirelessly, all the nodes need to exist within the wireless coverage.

FIG. 7 is a diagram for illustrating a tree type topology. The tree type topology is a recursively constructed topology in which one terminal node in a star type topology plays the role of the centered node of another start type topology. Communication to a separate node which does not share any communication path 2 is realized by transferring information from one node to another in a bucket brigade manner.

Since, in general, it is easy to install a wireless network compared to a wired network, a wireless network may be used in whole or part of a network.

Of the topologies in FIGS. 1 to 7, the topologies of the cascade type in FIG. 4, the mesh type in FIG. 5 and the tree type in FIG. 7, all using multi-hop scheme that transfers data in a bucket brigade manner, are suitable for a wireless network to cover a wide range since they can be constructed without the coverage of radio waves being restricted. Further, it is possible for mesh type and tree type topologies to construct a large-scale network that covers a wide range with a large number of nodes, in a relatively simple manner.

In a mesh type topology, there are a plurality of paths to reach one node. This produces the advantage that if a fault has occurred in a certain path it is possible to bypass the path. However, this needs a task called routing to determine a route. In wireless networks, there are many cases where it is difficult for each node to acquire connection information necessary for routing. Also, transmission of the connection information may increase the load on the network.

On the other hand, in a tree type topology, no routing is needed from the viewpoint that to reach one node there is only a single path.

All the nodes that participate in the network are assigned with an address. Data flowing through the network is distributed to the destination based on this address.

FIG. 8 shows a condition where addresses are assigned in a tree type topology described in Japanese Patent Application Laid-open 2006-5928 (which will be referred to hereinbelow as patent document 1). In this case, addresses are assigned in consideration of two network parameters Cm and Lm, taking into account that HOST(A) includes individual nodes each connected with subordinate nodes. Here, Cm indicates the maximum number of subordinate nodes connectable to each node and Lm indicates the maximum level of depth of the three structure.

For example, when HOST has an address s for its own, an address of s+1 is assigned to the node that is connected first. The node connected second is assigned with an address of s+1+Cskip$_{Ls}$. The node connected thereafter is assigned with an address of s+1+2·Cskip$_{Ls}$. That is, the node that is connected at the Cm-th, is assigned with an address of s+1+(Cm−1)·Cskip$_{Ls}$. Here, Cskip$_{Ls}$ can be represented by the following formula. This expression is referred to as formula 1.

$$Cskip_{Ls} = \frac{B_L - \overset{Ls}{\underset{k=0}{Q}}(Cm)^k}{Cm^{Ls+1}}$$ [Formula 1]

In the formula, $B_L$ means the total size of addresses in the network, $L_S$ the level number of the HOST having an address of s. Here, $B_L$ is calculated by the following formula using Cm and Lm. This formula is referred to as formula 2.

$$B_L = \frac{1 - Cm^{Lm+1}}{1 - Cm} \qquad \text{[Formula 2]}$$

The HOST gives to each node Cm and Lm that are defined by itself. In this way, each node also assigns addresses to the subordinate nodes of its own in the manner described above.

In FIG. 8, node A is HOST. Node A has an address of 0 and Cm and Lm are each defined to be 4. On the other hand, node A is connected with subordinate nodes B, C and D. From formula 2, $B_L$, the total size of addresses usable in the HOST is determined to be 341. When formula 1 is calculated using this, Cskip of the HOST is determined to be 85. As a result, the addresses of subordinate nodes B, C and D are assigned to be 85 which are separated from each other.

Specifically, node B that is connected first is assigned with an address of 1, node C that is connected second is assigned with an address of 86 and node D is assigned with an address of 171. On the other hand, Cskip of nodes B, C and D belonging to the first level (Ls=1) is calculated to be 21 based on formula 2. As a result, the addresses of nodes E to J that belong to the second level (Ls) are 21 apart from one another.

In the address assigning scheme of FIG. 8, each node in the whole network is assigned with an address using fixed Cm and Lm. That is, each device receives Cm and Lm from its superordinate device, then assigns addresses to its subordinate devices using the aforementioned formulae 1 and 2.

DISCLOSURE OF INVENTION

As described above, use of a mesh type or tree type topology makes it possible to construct a large-scale network that covers a wide area exceeding the coverage of radio waves in the wireless communication and that includes a large number of nodes, in a relatively simple manner. However, the mesh type topology has a problem in which routing is needed since there are a plurality of paths to reach.

Further, in the tree type topology, use of the address assigning scheme shown in patent document 1 gives rise to the problem in which the size of the address management table becomes enormous.

It is an object of the present invention to provide a communication network, information processor and address assigning method, which can reduce the size of the address management table without need of routing for narrowing the communication paths between nodes to one path.

The communication network of the present invention includes: a plurality of superordinate nodes forming a cascade type topology; and, a plurality of terminal nodes, connected to at least one superordinate node from among the plurality of superordinate nodes, the plurality of terminal nodes forming a star type topology with the superordinate node connected.

The address assigning method of the present invention is an address assigning method for a communication network including a plurality of information processors forming a cascade type topology and a plurality of terminal nodes which are connected to at least one from among the plurality of the information processors, the plurality of terminal nodes forming a star type topology with the information processor connected, wherein the superordinate node assigns to the terminal node connected thereto, an address including a hop number that indicates a depth level of a self-node from the most upstream node to downstream with respect to a predetermined communication direction in communication paths of the cascade type topology, and a node sub-number that is different from those of the plurality of terminal nodes connected thereto.

According to the present invention, since there is no need of routing to select one communication path from one node to another, it is possible to reduce the transfer processing load on the nodes located along the communication path during frame transfer. Further, it is possible to inhibit enlargement of the address system and reduce the scale of the address management table compared to that of the related communication network technology. Accordingly, the memory capacity for storing the address management table can be made smaller than that of the related communication network technology.

DESCRIPTION OF REFERENCE NUMERALS

1$10$ to 1$m0$ superordinate node 111 to 1$mn$ terminal node 54 storage 56 controller 100 basestation

BEST MODE FOR CARRYING OUT THE INVENTION (The First Exemplary Embodiment)

Figure 1:
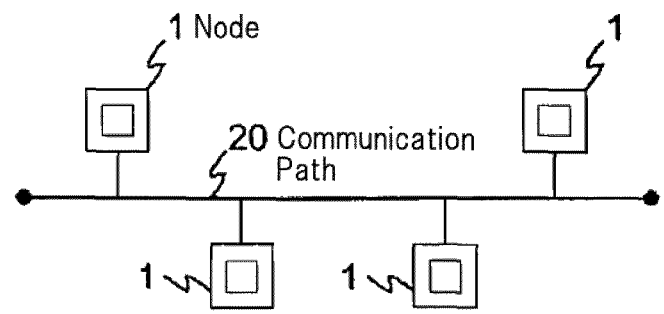
FIG. 1 is a diagram showing a bus type topology as one example of a related communication network.
Figure 2:
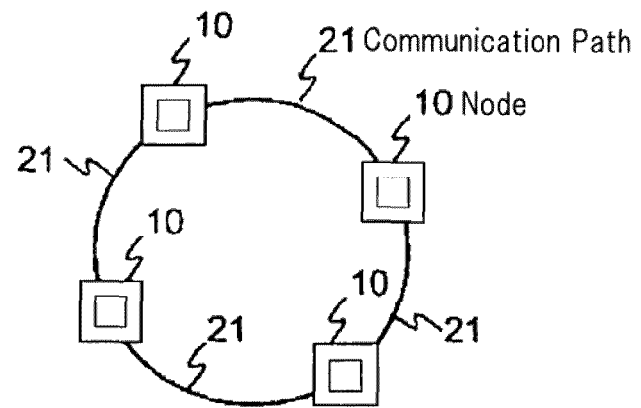
FIG. 2 is a diagram showing a ring type topology as one example of a related communication network.
Figure 3:
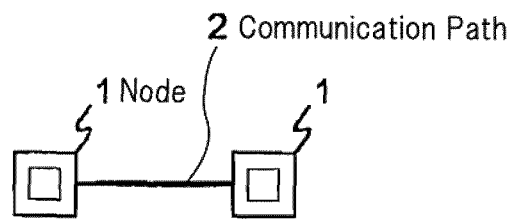
FIG. 3 is a diagram showing a peer-to-peer type topology as one example of a related communication network.
Figure 4:
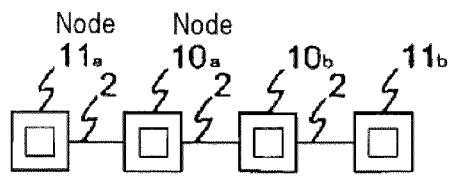
FIG. 4 is a diagram showing a cascade type topology as one example of a related communication network.
Figure 5:
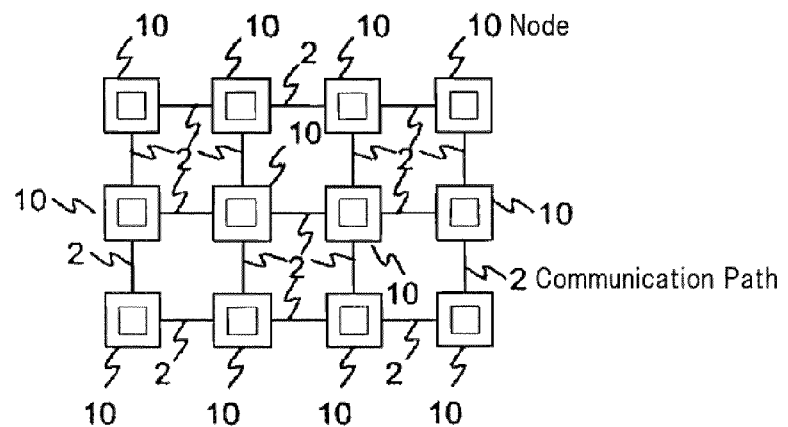
FIG. 5 is a diagram showing a mesh type topology as one example of a diagram showing a related communication network.
Figure 6:
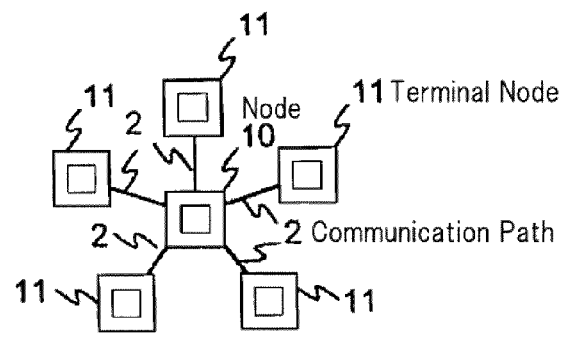
FIG. 6 is a diagram showing a star type topology as one example of a related communication network.
Figure 7:
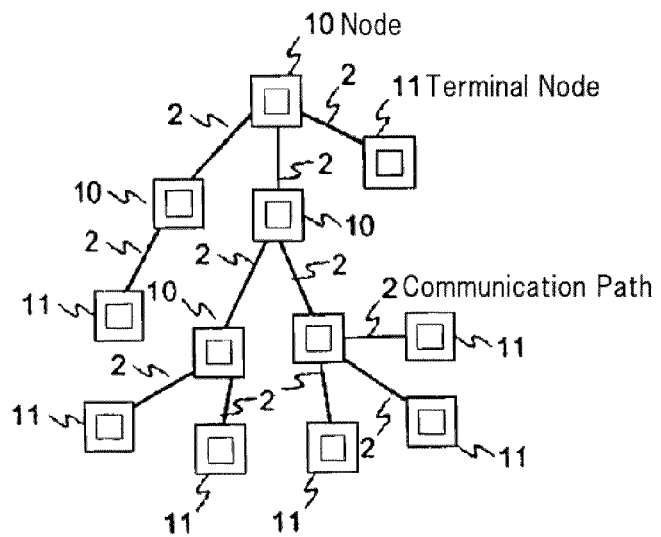
FIG. 7 is a diagram showing a tree type topology as one example of a related communication network.
Figure 8:
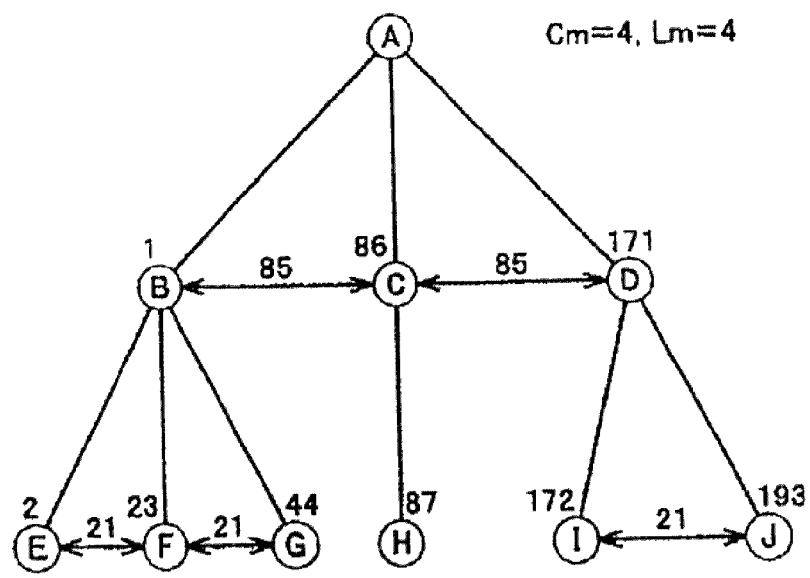
FIG. 8 is a diagram showing one example of an address assigning method in a tree type topology.
Figure 9:
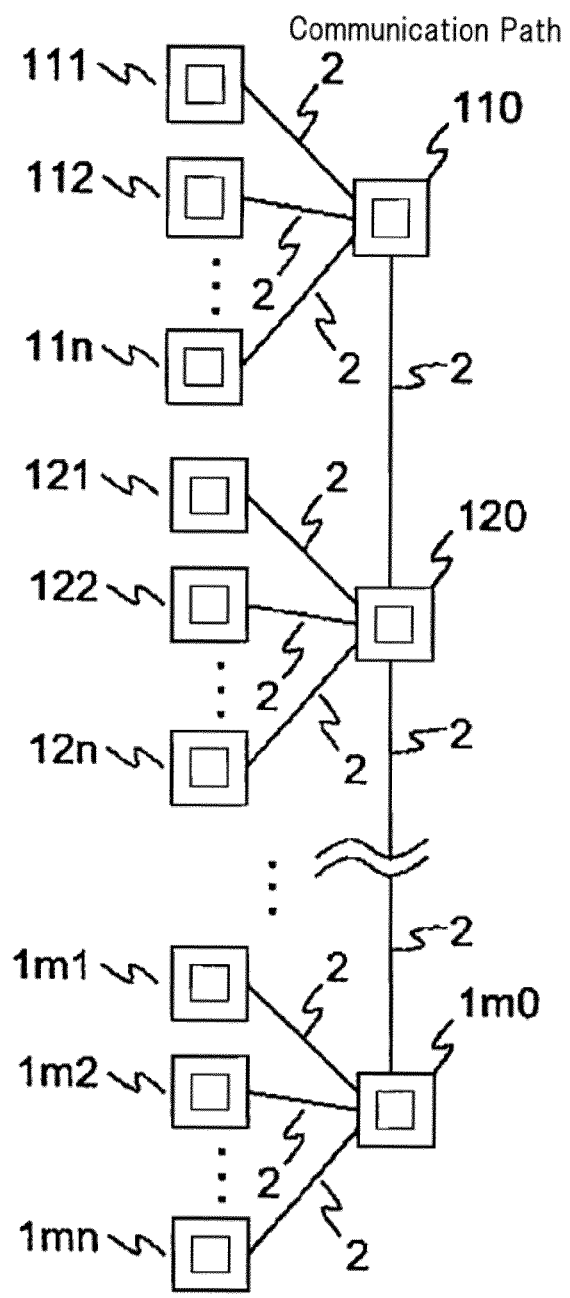
FIG. 9 is a diagram showing one configurational example of a communication network of the first exemplary embodiment.

The configuration of a communication network of the present exemplary embodiment will be described. FIG. 9 is a diagrams showing one configurational example of a communication network of the present exemplary embodiment.

As shown in FIG. 9, the communication network includes a superordinate node CH(110) and a plurality of terminal nodes CM(111, . . . , 11n) connected to this superordinate node. The superordinate node CH and plural terminal nodes CM form a star type topology in which the plural terminal nodes CM are connected to the centered superordinate node CH. Each of superordinate nodes CH(120, . . . , 1m0) and its plural terminal nodes CM(121, . . . , 12n . . . , 1m1, . . . 1mn) have a similar relationship therebetween.

Each superordinate node CH is connected to either one upstream node alone or to one upstream node and one downstream node alone. The connected plural superordinate nodes CH form a cascade type topology.

Communication path 2 between nodes may be established wiredly or wirelessly or both wiredly and wirelessly.

Figure 10:
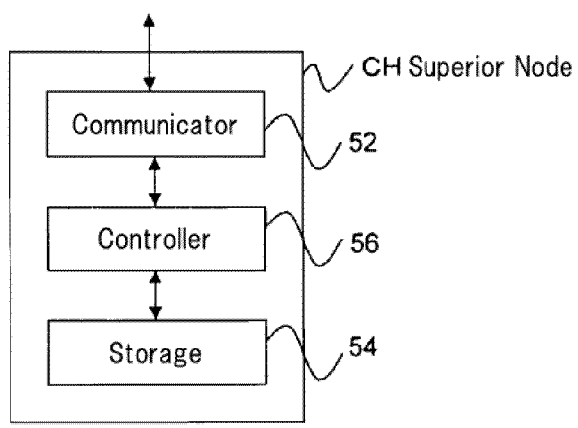
FIG. 10 is a block diagram showing one configuration example of a superordinate node.

FIG. 10 is a block diagram showing one configurational example of a superordinate node. Each superordinate node CH includes: communicator 52 for transmitting and receiving information to or from the outside via the communication path; storage 54 in which an address management table (which will be referred to hereinbelow as an address table) is stored; and controller 56 for controlling each part.

Controller 56 includes: a CPU (Central Processing Unit) for executing a predetermined process in accordance with a program; and a memory for storing the program. In the program, an address assigning method to terminal nodes is described. The address assigning method will be described with examples.

Figure 11:
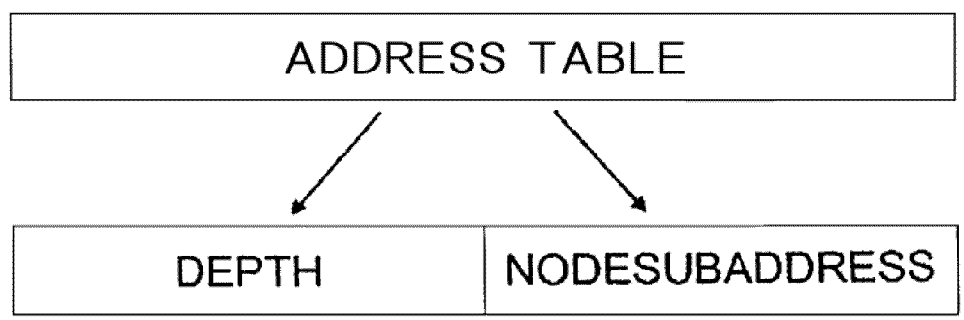
FIG. 11 is a diagram showing one example of an address configuration in the first exemplary embodiment.

FIG. 11 is a diagram for illustrating an address table in the communication network of the present exemplary embodiment.

Described in the address table is a combination of the hop number that shows the depth level of superordinate node CH connection and node sub-numbers that show the addresses in the star type topology. In FIG. 11, node sub-number is written as NODESUBADDRESS and the hop number is written as DEPTH. The node sub-numbers function as identifiers for the superordinate node to identify plural terminal nodes connected thereto. This address table is stored in storage 54.

For example, for terminal node CM 121 in FIG. 9, the depth level of the cascade type topology of superordinate node CH 110 is "2" and NODESUBADDRESS in the start type topology centered by superordinate node CH 110 is "1", so the address is "2.1".

When a terminal node CM is connected, controller 56 of the superordinate node CH assigns an address of the hop number and a node sub-number to the terminal node CM, and registers the address into the address table. Controller 56, referring to the address table, can identify each terminal node when it transmits and receives data to and from a terminal node CM.

Though in the present exemplary embodiment, all the superordinate nodes CH are connected with n terminal nodes CM, the number of terminal nodes CM may be different in each superordinate node CH. Further, there may exist a superordinate node CH that has no terminal node CM. In any of these cases, the same effect can be obtained.

Further, terminal node CM may have the same configuration as that shown in FIG. 10. In this case, it is not necessary to describe the address assigning method in a program.

(The Second Exemplary Embodiment)

Figure 12:
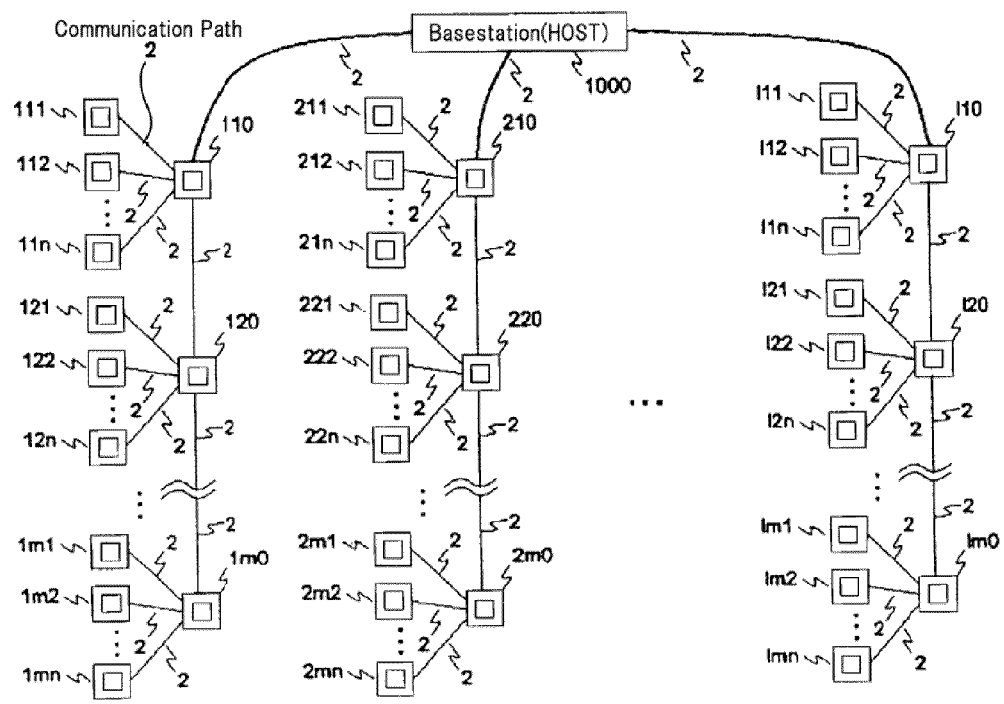
FIG. 12 is a diagram showing one configurational example of a communication network in the second exemplary embodiment.

The configuration of a communication network of the present exemplary embodiment will be described. FIG. 12 is a diagram showing one configurational example of a communication network in the present exemplary embodiment.

As shown in FIG. 12, the communication network includes a superordinate node CH(110) and a plurality of terminal nodes CM(111, . . . , 11n) connected to this superordinate node. The superordinate node CH and the plurality of terminal nodes CM form a star type topology in which the plural terminal nodes CM are connected to the centered superordinate node CH. Each of superordinate nodes CH(120, . . . , 1m0) and its plurality of terminal nodes CM(121, . . . , 12n . . . , 1m1, . . . 1mn) have a similar relationship therebetween.

Similarly to the first exemplary embodiment, each superordinate node CH is connected to either one upstream node alone or to one upstream node and one downstream node alone. The connected plural superordinate nodes CH form a cascade type topology.

Further, in the present exemplary embodiment, among the superordinate nodes CH, the superordinate nodes (110, 210, . . . , 110) located most upstream are connected to and centered by basestation (HOST) 1000 located higher than these, forming a start type topology. Accordingly, the relationship between basestation 1000 and plural superordinate nodes CH (110, 210, . . . , 110) is the same as the relationship between each superordinate node CH and plural terminal nodes CM.

Here, basestation 1000 includes a similar configuration made of communicator 52, controller 56 and storage 54 shown in FIG. 10. Further, the configurations of the superordinate nodes CH and terminal nodes CM are the same as the first exemplary embodiment. Herein, detailed description of these configurations is omitted.

Figure 13:
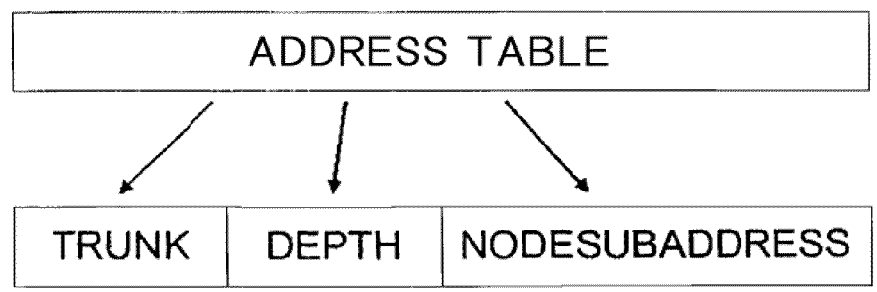
FIG. 13 is a diagram showing one example of an address configuration in the second exemplary embodiment.

FIG. 13 is a diagram for illustrating an address table in the communication network of the present exemplary embodiment.

Described in the address table is a combination of TRUNK that shows the branch number branched from basestation 1000, DEPTH that shows the depth level of the superordinate node CH connection and NODESUBADDRESS that shows the address in the star type topology. Here, for example, node 121 in FIG. 12 has an address of "1.2.1".

When a terminal node CM is connected, controller 56 of the superordinate node CH assigns an address of the branch number to distinguish a plurality of communication paths 2 connected to basestation 1000 in a cascade type topology manner, a hop number and a node sub-number to the terminal node CM, and registers the address into the address table.

EXAMPLE 1

This example is to variably manage the numbers of bits used for the fields of TRUNK, DEPTH and NODESUBADDRESS in an effective manner, using address set registers when the address table shown in FIG. 13 is used.

Figure 14:
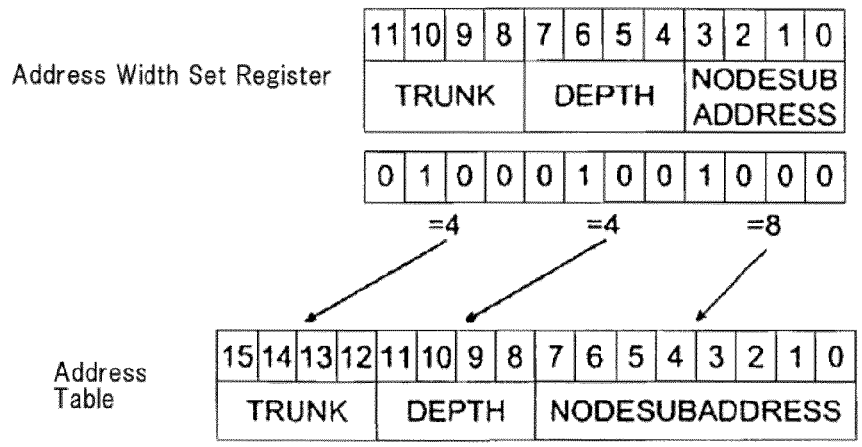
FIG. 14 is a diagram for illustrating an address assigning method of example 1.

FIG. 14 is a diagram for illustrating the address assigning method of the example.

This relates to an address assigning method from upstream nodes to downstream nodes. This is the method of basestation 1000 assigning addresses to a plurality of superordinate nodes (110, 210, . . . , 110) and each superordinate node (110, . . . ,lmn) assigning addresses to a plurality of terminal nodes (111, . . . , 11n, . . . , 1m1, . . . , lmn). The specific operation is effected as follows.

To begin with, a 4-bit address width set register is assigned for each of the TRUNK, DEPTH and NODESUBADDRESS. Subsequently, as many bits as the value in the address width set register are prepared in the address table for each TRUNK field, DEPTH field and NODESUBADDRESS field. In the present example, the number of bits for the TRUNK and DEPTH fields are set at 4 and the number of bits for the NODESUBADDRESS field is set at 8.

With this arrangement, it is possible to flexibly manage the sizes of the TRUNK field, DEPTH field and NODESUBADDRESS field in an effective manner, and it is hence possible to deal with an increase and decrease of terminal nodes, variation of DEPTH, the depth level, in a flexible manner.

A specific example of an address assigning method will be described in the case of the communication network shown in FIG. 12.

When basestation 1000 has an address of "T.D.N" (T=D=N=0 because of HOST) for its own, the superordinate node CH that is connected first is assigned with "T+1.D+1.N" or "1.1.0". Then, the superordinate node CH that is connected second is assigned with "T+2.D+1.N" or "2.1.0" as far as the size of the TRUNK field permits.

Further, when a superordinate node CH has an address of "T.D.N" (N=0 because of CH) for its own, the superordinate node CH that is connected first alone is assigned with "T.D.N" (N=0 because of CH) as far as the size of the DEPTH field permits. Then, the terminal node CM that is connected first is assigned with "T.D.N+1", and the terminal node CM that is connected second is assigned with "T.D.N+2" as far as the size of the NODESUBADDRESS field permits.

Next, the address assigning method of the example will be compared with the method described in the background art. In the topology of the example shown in FIG. 12, the maximum values of the TRUNK, DEPTH and NODESUBADDRESS are represented as l, m and n, respectively and a case with n=14, m=5 and l=14 is assumed.

The total address size $B_L$ of the example can be determined by "the maximum of TRUNK×the maximum of DEPTH×the maximum of NODESUBADDRESS", or n×m×l. In this case, the total address size $B_L$ amounts to 980. This can be put into an address table for 10 bits. Further, even if l, m and n are put into separate address tables, n, m and l can be represented by 4 bits, 3 bits and 4 bits, respectively, so an address table of 4+3+4=11 (bits) can manage all the nodes.

On other hand, the topology shown in FIG. 12 will be represented based on the assigning method described in the background art. Since the maximum number of subordinate nodes connectable to each node is the greater one of n and l, Cm is 14. Since the depth levels of the tree structures are the same, Lm is 5. Accordingly, the total address size $B_L$ amounts to 579195, which needs an address table for 20 bits.

This difference is attributed to the difference of how the total address size increases when the depth level increases. In the network topology and address assigning method of the example, the total address size increases in proportion to the increase of the depth level. In contrast, in the related tree type topology and address assigning method, the total address size increases exponentially with the increase of the depth level, as apparent from formula 2.

EXAMPLE 2

This example shows one example of a technique of determining whether a received frame will be sent to the self-node or to another node when the address assignment described in the second exemplary embodiment is used.

In the example, designation of the address in transferring data, commands, etc. supports three designating methods.

(1) Unicast

An address designating method for a case where in a network data is transmitted to a particular node by designating a single address will be described. TRUNK, DEPTH and NODESUBADDRESS are designated in the form of "TRUNK.DEPTH.NODESUBADDRESS".

(2) Multi-Cast Using a Wild Card

An address designating method for a case where in a network the same data is transmitted to a plurality of nodes will be described. When it is desired that all nodes in each of the TRUNK, DEPTH and NODESUBADDRESS fields be designated as the destination, a wild card that indicates "all the nodes" is used. To indicate a wild card, a particular value is set in advance. In the present example, the particular value is designated to be the maximum value (all bits are "1") of the field. Next, a specific example will be described taking a specific example where the address set register is conditioned as shown in FIG. 14.

TRUNK.DEPTH.11111111: designate all the nodes having the same TRUNK and DEPTH;

TRUNK.1111.11111111: designate all the nodes having the specified TRUNK value;

TRUNK.1111.0: designate all the relay nodes having the specified TRUNK value;

TRUNK.1111.NODESUBADDRESS: designate all the nodes having the same TRUNK and NODESUBADDRESS;

1111.DEPTH.NODESUBADDRESS: designate all the nodes having the same DEPTH and NODESUBADDRESS; and 1111.1111.11111111: designate all nodes.

Here, the particular value is not limited to the above case, but the same may hold when another value is set.

(3) Multi-Case Using a SubNetMask

As one method for designating destination addresses, a SubNetMask can be used to determine the effective range of multicast designation. When destination addresses are designated, the use of a designating method of destination addresses with a SubNetMask makes it is possible to designate addresses in a more flexible manner. As a determination method for SubNetMask, address comparison between the destination address and the SubNetMask is performed to identify the destination address at those bits where the bits of the SubNetMask are "1" while both "0" and "1" are permitted whatever the figure of the destination address is when the corresponding bit of the SubNetMask is "0". This case will be shown taking specific examples below under the condition in which the address set register has the value shown in FIG. 14.

EXAMPLE 1

Destination address=1011.1011.11010111
SubNetMask=1111.1110.11111111,

Address comparison is performed between these. Since the TRUNK field and NODESUBADDRESS field of the SubNetMask are all filled with "1", TRUNK=1011 and NODESUBADDRESS=11010111 are designated. In the DEPTH field of the SubNetMask, the top three digits are "1" and the lowest digit is "0", so that DEPTH=1010 or 1011 is designated. Accordingly, all the nodes in which TRUNK=1011, DEPTH=1010 or 1011 and NODESUBADDRESS=11010111 are designated.

EXAMPLE 2

Destination address=1011.1011.11010111
SubNetMask=1111.1110.00000001

Address comparison is performed between these. Since the TRUNK field and DEPTH field of the SubNetMask are all filled with "1", TRUNK=1011 and DEPTH=1011 are designated. In the NODESUBADDRESS field of the SubNetMask, the lowest digit is "1" with the other digits set at "0", so that the lowest digit is designated as 1 and other digits can take a value of either "0" or "1". Accordingly, all the nodes in which TRUNK=1011, DEPTH=1011 and NODESUBADDRESS having 1 set as the lowest digit are designated.

The determination condition with a SubNetMask is not limited to the above case. For example, a similar result can be obtained when only the digits with "0" are compared.

Next, an address filtering process of a received frame will be described. The processing method of the example can deal with either a case where a frame has a SubNetMask or a case without it. A receiving node performs an address filtering process by means of controller 56 in the sequence described as follows to determine whether the received frame is sent to itself.

Figure 15:
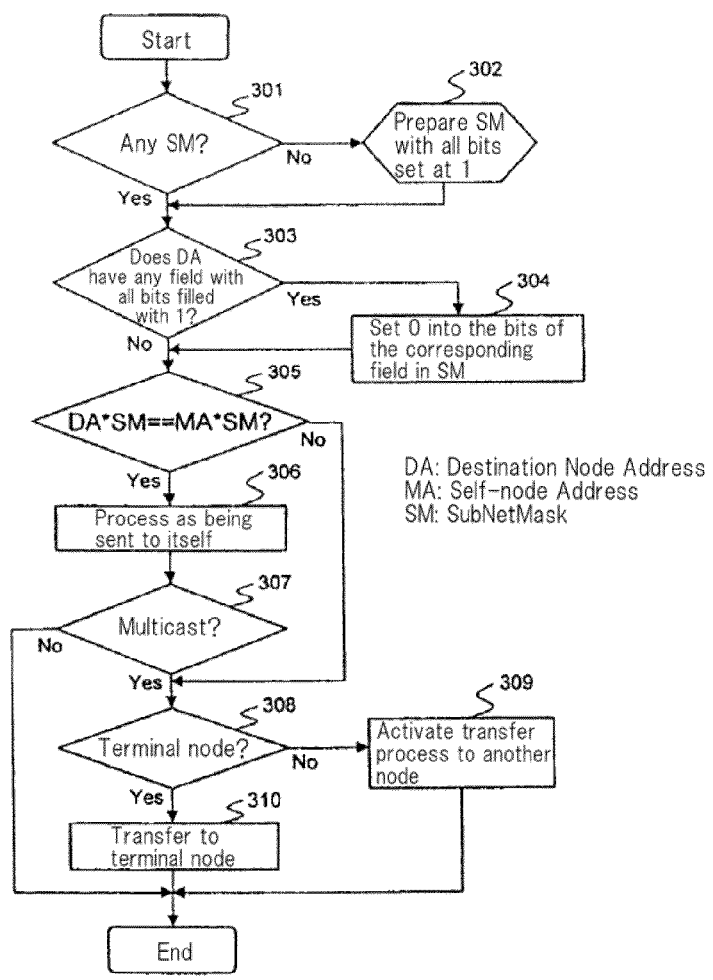
FIG. 15 is a flow chart showing the sequence for determining the designation of a frame in example 2.

FIG. 15 is a flow chart showing the sequence for determining the designation of a frame.

Controller 56, which receives a frame from another node, determines whether the frame has a SubNetMask (SM) or not (Step 301). If it has no SM, a SM having all fields of TRUNK, DEPTH and NODESUBADDRESS filled with "1" is prepared (Step 302). If it has a SM, no SM is prepared.

Subsequently, as to the destination node address (DA), it is determined whether there is any field having all bits filled with "1" among the aforementioned three fields (Step 302). If there is a field having all bits filled with "1", all the bits of the corresponding field in the SM are set at "0" (Step 304). If there is a field having all bits set at "1" in the DA, this means that all the nodes that can be designated by that field have been designated as the destinations of the frame to be transferred. Filling the field with "0" in the SM is to avoid the abovementioned meaning becoming insignificant in the bit operation that follows, as described in the above examples 1) and 2).

Thereafter, controller 56 determines whether a bit operation DA*SM==MA*SM holds (Step 305). Subsequently, if this equation holds, the controller processes the frame as being sent to its own node (Step 306). Since, in the case of multicasting, other addresses than that of the node of its own are included, it is determined whether the frame is multicast or not (Step 307). If it is not multicast, the process is ended because it is sent to the node alone.

When the frame is determined to be multicast at Step 307, it is determined whether the destinations other than the node are terminal nodes (Step 308). Also, when DA*SM==MA*SM does not hold at Step 305, the process at Step 308 is executed. When the destination is not to a terminal node at Step 308, a transfer process to the other node is activated (Step 309). When the designation is to a terminal node, the frame is transferred to the terminal node (Step 310).

EXAMPLE 3

This example is an application of the communication network and address assigning method described in the second exemplary embodiment to building management.

Figure 16:
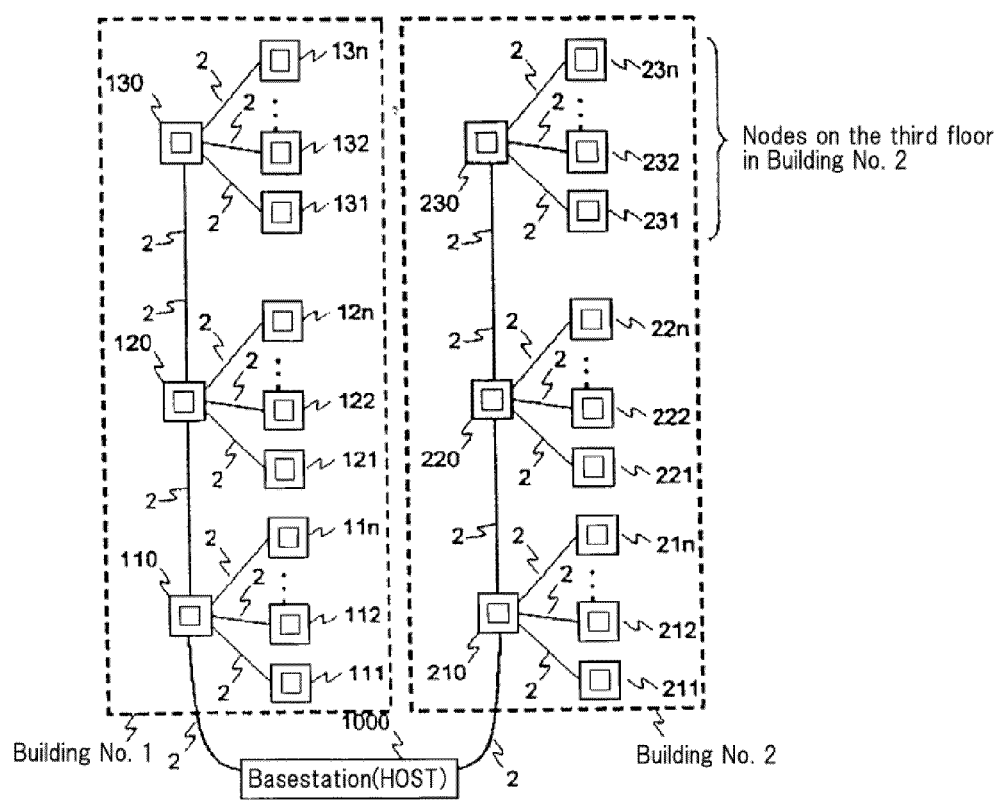
FIG. 16 is a diagram for illustrating an address assigning method in example 3.

FIG. 16 is a diagram for illustrating an address assigning method in this example. Referring to FIG. 16, a case of applying the address assigning method of the present invention to building management will be described.

Based on the communication network and address assigning method described in the second exemplary embodiment, the nodes on TRUNK=1 are used for building No. 1 and the nodes on TRUNK=2 are used for building No. 2. Similarly, the nodes of DEPTH=1 are used for the building's first floor and the nodes of DEPTH=2 are used for the second floor and the nodes of DEPTH=3 are used for the third floor.

With the arrangement of nodes as above, address designation of example 2 is further used. Here, when the case of the address set register value in FIG. 14 is taken as an example of an address set register value, to designate all the nodes on the third floor in building No. 2, 0010.0011.11111111 is used as a destination address. This is represented as "2.3.255" in decimal number, so that it is possible to find the node address intuitively.

When the communication network and address assigning method of the present invention are applied to building management or the like and TRUNK is made to correspond to a building and DEPTH is made to correspond to a floor, it is possible to give an address that is intuitively understandable such that a node with TRUNK=2 and DEPTH=3 is the node on the third floor at building No. 2. This makes production of application software easy.

In the communication network of the present invention, a plurality of superordinate nodes are connected linearly, and a plurality of terminals nodes are directly connected to centered superordinate nodes. This configuration makes the route from one node to another unique so that no complex process for routing is needed. Further, the order of arrangement of superordinate nodes is uniquely determined so that it is possible to determine the address of each superordinate node in a cascade type topology based on the hop number that coincides with the order of the arrangement.

When each superordinate node gives identifiers (node subnumbers) to a plurality of terminal nodes that are connected to the superordinate node, the address of each terminal node can be identified based on the order of arrangement of the superordinate nodes and the identifier that is different from among a plurality of terminal nodes connected to the same superordinate node, corresponding to each of the plurality of terminal nodes. As a result, it is possible to construct a simple address system compared to the communication network technology described in the background art.

According to the present invention, it is possible to construct a large scale network that covers a wide communication area exceeding the coverage of radio waves of the wireless communication and that includes a large number of nodes, in a simple manner compared to the communication network technology described in the background art. Further, there is no need of routing to select one communication path from one node to another. Accordingly, it is possible to reduce the transfer processing load on the nodes located along the communication path when a frame is transferred.

Further, it is possible to inhibit enlargement of the address system and reduce the scale of the address management table compared to that of the communication network technology described in the background art. Accordingly, the memory capacity for storing the address management table can be made smaller than that of the communication network technology described in the background art.

Moreover, when a superordinate node gives an address to a subordinate node, if, for example the subordinate node is a terminal node, allocating a new node sub-number will be sufficient. Accordingly, there is no need to refer to network parameters such as Cm, Lm and the like exemplified in patent document 1. As a result, there is no need for notifying part of nodes of Cm, Lm and other values, hence it is possible to cut down unnecessary communication.

It should be noted that the communication network and address assigning method of the present invention can be applied to wireless sensor network purposes used in home management for integrated control of various sensors inside the home, air-conditioning control and monitoring cameras and security management of entrance and exit and the like in a building. Various sensors inside the home may include sensors for lighting of indoor lights, room temperature, refrigerator temperature, etc.

Further, the address assigning method of the present invention is not limited to the case where it is implemented by the superordinate nodes but the operator may set the address of each terminal node using the address assigning method of the present invention.

While the invention has been particularly shown and described with reference to exemplary embodiments and examples thereof, the invention is not limited to these embodiments and examples. It will be understood by those of ordinary skill in the art that various changes in form and details may be made therein without departing from the spirit and scope of the present invention as defined by the claims.

This application is based upon and claims the benefit of priority from Japanese Patent Application No. 2006-315610 filed on Nov. 22, 2006, the content of which is incorporated by reference.

The invention claimed is:

1. A communication network comprising:
a basestation;
a plurality of superordinate nodes;
a plurality of terminal nodes;
a plurality of cascade type topologies, each cascade type topology including a different sub-plurality of the superordinate nodes, each cascade type topology being a different branch connected to the basestation and having a branch number; and
a plurality of star type topologies, each star type topology including a different sub-plurality of the terminal nodes and one of the superordinate nodes,
wherein each superordinate node, as a given superordinate node, has an address indicating the different branch of the cascade typology in which the given superordinate node is included, and indicating a hop number of a depth of the given superordinate node from the basestation within the cascade typology in which the given superordinate node is included,
and wherein each terminal node, as a given terminal node, has an address indicating the different branch of the cascade typology in which the superordinate node is included that is in the star type topology in which the given terminal node is also included, indicating the hop number of the address of the superordinate node included in the star type topology in which the given terminal node is also included, and indicating a node sub-number uniquely identifying the given terminal node within the star type topology in which the given terminal node is included.

2. The communication network according to claim 1, wherein
when a plurality of identical frames are transmitted that each have a node address including a predetermined hop number and a predetermined node sub-number, the node address of each identical frame includes a branch number that is a wild card.

3. The communication network according to claim 1, wherein
when a plurality of identical frames are transmitted that each have a node address including a predetermined branch number and a predetermined node sub-number, the node address of each identical frame includes a hop number that is a wild card.

4. The communication network according to claim 1, wherein
when a plurality of identical frames are transmitted that each have a node address including a predetermined branch number and a predetermined hop number, the node address of each identical frame includes a node sub-number that is a wild card.

5. The communication network according to claim 1, wherein at least a pair of the superordinate nodes and the terminal nodes communicate with one another in a wireless manner.

6. An information processor of a communication network including a basestation, a plurality of superordinate nodes where the information processor is one of the superordinate nodes, a plurality of terminal nodes, a plurality of cascade type topologies, and a plurality of star type topologies, each cascade type topology including a different sub-plurality of the superordinate nodes, each cascade type topology being a different branch connected to the basestation and having a branch number, each star type topology including a different sub-plurality of the terminal nodes and one of the superordinate nodes, the information processor comprising:
a storage device storing an address management table; and
a controller to assign:
each superordinate node, as a given superordinate node, an address indicating the different branch of the cascade typology in which the given superordinate node is included, and indicating a hop number of a depth of the given superordinate node from the basestation within the cascade typology in which the given superordinate node is included,
each terminal node, as a given terminal node, an address indicating the different branch of the cascade typology in which the superordinate node is included that is in the star type topology in which the given terminal node is also included, indicating the hop number of the address of the superordinate node included in the star type topology in which the given terminal node is also included, and indicating a node sub-number uniquely identifying the given terminal node within the star type topology in which the given terminal node is included,
wherein the controller is to register the address of each subordinate node and the address of each terminal node into the address management table.

7. An address assigning method comprising:
providing a communication network including a basestation, a plurality of superordinate nodes, a plurality of terminal nodes, a plurality of cascade type topologies, and a plurality of star type topologies, each cascade type topology including a different sub-plurality of the superordinate nodes, each cascade type topology being a different branch connected to the basestation and having a branch number, each star type topology including a different sub-plurality of the terminal nodes and one of the superordinate nodes;
assigning each superordinate node, as a given superordinate node, an address indicating the different branch of the cascade typology in which the given superordinate node is included, and indicating a hop number of a depth of the given superordinate node from the basestation within the cascade typology in which the given superordinate node is included; and assigning each terminal node, as a given terminal node, an address indicating the different branch of the cascade typology in which the superordinate node is included that is in the star type topology in which the given terminal node is also included, indicating the hop number of the address of the superordinate node included in the star type topology in which the given terminal node is also included, and indicating a node sub-number uniquely identifying the given terminal node within the star type topology in which the given terminal node is included.

* * * * *